Sept. 4, 1934.     R. L. JENKINS ET AL     1,972,447
FINELY DIVIDED POWDERS AND METHOD OF MAKING SAME
Filed March 7, 1932
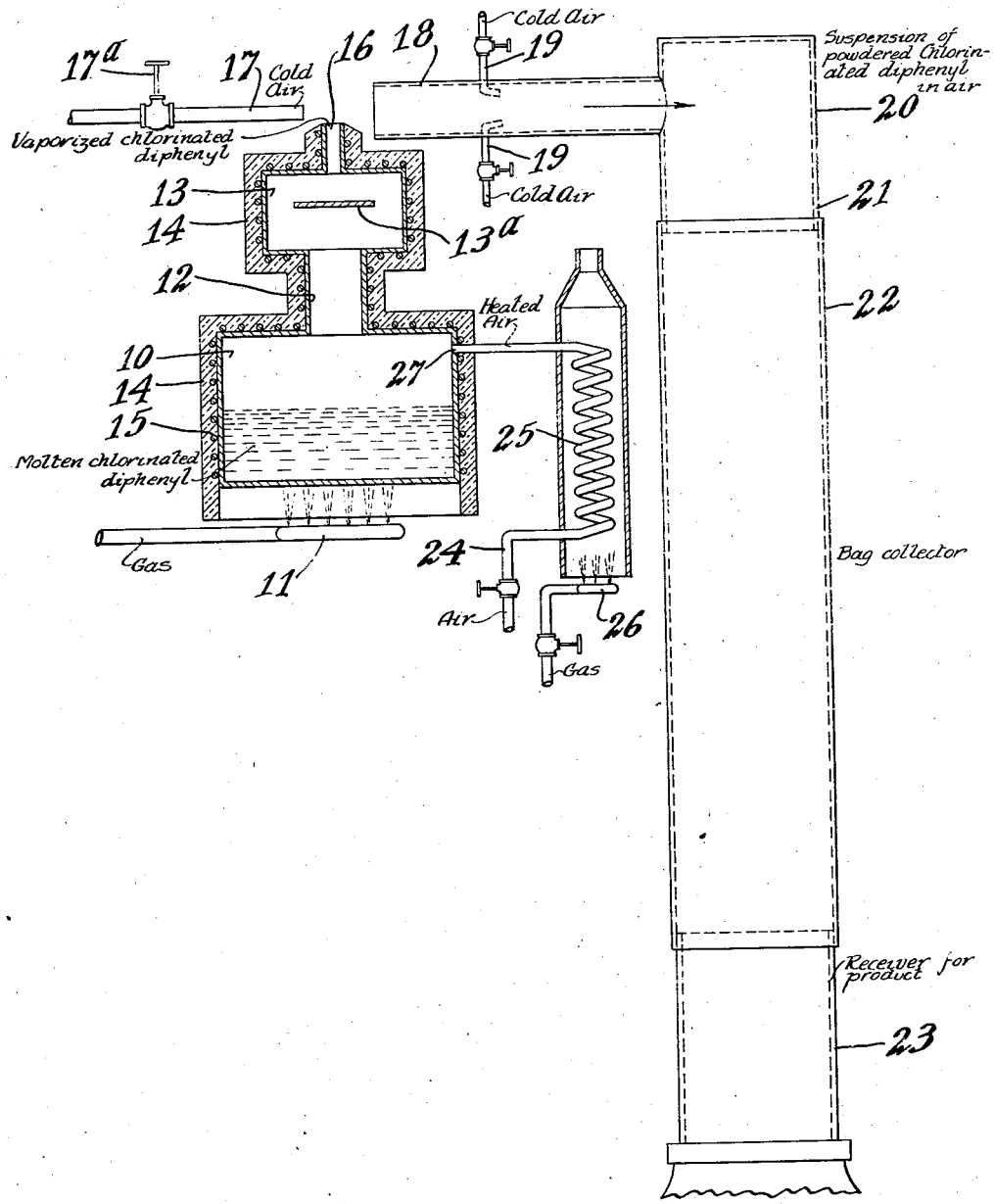
INVENTOR
R. L. Jenkins
T. W. Schilb
BY
Herbert J Chase.
ATTORNEY Patented Sept. 4, 1934

1,972,447

UNITED STATES PATENT OFFICE 1,972,447

FINELY DIVIDED POWDERS AND METHOD OF MAKING SAME

Russell L. Jenkins and Theodore W. Schilb, Anniston, Ala., assignors to Swann Research Incorporated, a corporation of Alabama Application March 7, 1932, Serial No. 597,138

11 Claims. (Cl. 260—161)

This invention relates to finely divided powders and to a method for producing same.

One object of this invention is the production of finely divided powders from high-melting substances. Another object is the production of finely divided powders from halogenated diphenyl. Still another object is the production of stable chemically resistant pigments from a highly halogenated diphenyl, particularly from highly chlorinated or brominated diphenyl. A still further object is the provision of a process by which high-melting substances generally may be produced in a finely divided form.

We have now discovered that high-melting bodies may be formed into finely divided non-adherent particles of extremely small size by cooling the vapors of the substance, either as such or after having been diluted with air or other gas. Such cooling of the diluted or undiluted vapors may take place by intermingling them with air or gas in amount sufficient to lower, the temperature of the vapors to a point below the melting point of the substance. We have also found that such intermingling may be advantageously carried out by allowing such vapors, diluted or undiluted, as the case may be, to mix with and be dispersed throughout a mass of air or other inert gas. Such dispersion may be effectively carried out by employing as a combining dispersing and cooling agent a stream of air, steam or other inert gas.

When we have employed the term "high melting" in order to designate the character of the bodies treated by our process, such a term is used in its relative sense. In this application this term is used to designate bodies melting above ordinary temperatures and distinguishes these bodies from those which are liquid at ordinary temperatures.

Our invention may be applied to the production of powders of a wide variety of substances both of inorganic or organic nature. The only requirement is that the substance shall be volatilizable substantially without decomposition and that it shall be solid at ordinary temperatures.

In conducting experiments to produce solid substances in a very finely divided state, we have discovered that if such substance be vaporized and then the vapor suddenly chilled by means of a cooling air or gas blast, or diluted with an inert gas and then chilled, very finely divided particles of the substance will be produced.

While we have found that our process may be applied to a variety of substances, we shall describe its application to the production of highly halogenated diphenyl, for example, a chlorinated diphenyl in finely divided state. As thus applied our process affords a means whereby a crystalline halogenated diphenyl may be completely changed into finely divided form. In the case of chlorinated diphenyl, this is impossible to accomplish by ordinary grinding means, such as a colloid mill, since some particles are never completely broken down to the desired small size.

Briefly stated, one feature of our invention consists in vaporizing a chlorinated diphenyl having a composition substantially expressed by the formula $C_{12}HCl_9$ then suddenly chilling the vapors by a rapidly moving air blast, the suspension of solid particles being separated from the air stream by appropriate means such as dust collectors, precipitators, or bag filters. More in detail, our invention as applied to a highly chlorinated diphenyl, will be apparent by reference to the accompanying drawing, the single figure of which illustrates diagrammatically the manner of carrying out our improved process.

Referring to the drawing, 10 is a boiler or vaporizer of suitable construction, heated by a gas burner 11. The boiler is connected with a disengaging chamber 13 by means of pipe 12. The upper part of boiler 10, pipe 12 and disengaging chamber 13 may be thermally insulated and heated to a temperature above the condensation temperature of the chlorinated diphenyl. For this purpose we show thermal insulation 14 covering the boiler 10, pipe 12 and chamber 13 and also covering electric resistance wires 15 by which means additional heat may be supplied to the liquid and vapor if desired. Disengaging chamber 13 contains baffles 13a inserted to impede the flow of the vapors and prevent droplets being carried over. A nozzle or vapor outlet 16 is mounted on chamber 13, and an air delivery pipe 17 provided with valve 17a is mounted transversely of said nozzle 16 with its end a short distance from and above the end of nozzle 16. A fume collecting duct 18 is centrally disposed with respect to the center line of pipe 17 and on the opposite side of nozzle 16 to that on which air pipe 17 is located. Duct 18 is provided with air jets 19 to provide additional acceleration to the air-fume mixture. Duct 18 communicates with an enlarged circular vertically disposed chamber 20, to the lower end 21 of which is fastened cloth bag 22, the end of which is attached to container or barrel 23. In order to facilitate operation of the vaporizer 10, a controlled amount of diluting air flows through pipe 24, is heated in coils 25 by gas burner 26 and is admitted to boiler 10 by means of inlet 27.

The operation of our device in producing a finely divided powder from chlorinated diphenyl is as follows: Vaporizer 10 is charged, through an opening not shown, with chlorinated diphenyl containing 69 percent of chlorine until it is half to two-thirds full. This substance is solid at ordinary temperature, having a melting point of about 245° C. The vaporizer and contents are heated by means of gas burner 11 to near the boiling point, which is approximately 400° C., for this material.

At the same time heat is supplied to the vaporizer 10, the connecting pipe 12 and the chamber 13 by means of the electrical winding 15. Heated air is now introduced at 27 in regulated amount by means of pipe 24 and 25, until copious fumes issue at the nozzle 16. By properly regulating the temperature of the liquid in vaporizer 10 and the heat supplied by coils 15, a vapor free of condensed droplets will be produced at nozzle 16. A rapid stream of cool air is now caused to be emitted by pipe 17, the vapors being struck by the cool air are suddenly chilled and the fume and air mixture is carried through duct 18 into the bag collector 20 and 22. Further additional velocity can be imparted to the fume and air within duct 18 by the injecting action of air admitted by pipes 19. The precipitated fume collects on the inner walls of bag 22 from whence it falls into container 23. The air passes out through the interstices of the cloth of which the bag is composed.

The product will be found to be in the form of a fine white powder, the individual particles of which are less than 1 micron (.001 m. m.) in diameter.

We have further discovered that an important factor which influences the uniformity of the particles of the product is the comparative size of the vapor nozzle 16 and the cooling air stream issuing from pipe 17. In order that the particles of the product be uniform, it is necessary that the size of the cooling air stream be as large or larger than the vapor stream. If this is not the case, the product will contain a considerable proportion of larger particles.

In the operation of our process we may use either an inert gas, air or steam as a cooling medium. For most purposes, as when working with a substance which is not subject to oxidation at the temperature of operation, air will be found satisfactory and convenient. If danger of oxidation exists, an inert gas such as nitrogen, carbon dioxide or steam may be employed.

During operation of the vaporizer, some condensation may be desirable within chamber 13 and pipe 12. Such condensation may be helpful as affording some measure of fractionation within pipe 12 by the aid of which a somewhat whiter product is obtained. If this is the case, heating of the pipe 12 and chamber 13 may be entirely dispensed with, or so regulated as to give the desired amount of condensate returning to the vaporizer 10 through pipe 12, fractionation then taking place in pipe 12. The effectiveness of fractionation within pipe 12 may be improved, in known manner, by inserting chemical ring packing within pipe 12.

The finely divided chlorinated diphenyl, which has particularly valuable pigmenting properties, is a white non-toxic impalpable powder, with an average apparent density of approximately 0.2 as compared with water, and a refractive index averaging 1.72. It has a chlorine content of approximately 69%, and an average chemical composition corresponding to the formula $C_{12}HCl_9$.

In similar manner to the above a highly brominated diphenyl containing 82% of bromine may be dispersed in the form of a white very finely divided powder. A product containing this amount of bromine present may vary somewhat but on the average will correspond to the formulae $C_{12}H_2Br_8$ or $C_{12}HBr_9$.

While we have described several embodiments of our invention, it will be apparent to those skilled in the art that it is not so limited, but that it is susceptible of various changes and modifications without departing from the spirit thereof, and we desire that only such limitations shall be placed thereupon as may be imposed by the prior art or as are specifically set forth in the appended claims:

What we claim is:—

1. A method of producing a finely powdered highly halogenated diphenyl of the group consisting of chlorinated diphenyl and brominated diphenyl from solid mass of the same which consists in first vaporizing the said halogenated diphenyl, heating said vapors above their dew point, and then suddenly chilling the heated vapors with a cooling air blast.

2. A method of producing a finely powdered highly halogenated diphenyl of the group consisting of chlorinated diphenyl and brominated diphenyl from solid mass of the same which consists in first vaporizing the said halogenated diphenyl, heating and freeing said vapors of droplets of liquid and then suddenly chilling the heated vapors with a cooling air blast.

3. A method of producing a finely powdered highly halogenated diphenyl of the group consisting of chlorinated diphenyl and brominated diphenyl from solid mass of the same which consists in first vaporizing the said halogenated diphenyl, combining therewith a current of heated air whereby said vapor is freed of droplets, and then suddenly chilling said vapors with a cooling air blast.

4. A method of producing finely powdered highly chlorinated diphenyl from solid mass of the same which consists in first vaporizing said chlorinated diphenyl, heating said vapors above the dew point, and then suddenly chilling the heated vapors with a cooling air blast.

5. A method of producing finely divided highly chlorinated diphenyl from solid mass of the same, which consists in first vaporizing the chlorinated diphenyl, heating and freeing said vapors of droplets of liquid, and then suddenly chilling the heated vapors with a cooling air blast.

6. A method of producing finely powdered highly chlorinated diphenyl from solid mass of the same which consists in first vaporizing the said chlorinated diphenyl, combining therewith a current of heated air whereby said vapor is freed of droplets, and then suddenly chilling said vapors with a cooling air blast.

7. Finely powdered halogenated diphenyl made up of irregularly shaped particles having an average diameter of less than 1 micron.

8. Finely powdered chlorinated diphenyl made up of irregularly shaped particles having an average diameter of less than 1 micron and a chemical composition corresponding to the formula $C_{12}HCl_9$.

9. Finely powdered chlorinated diphenyl made up of irregularly shaped particles with an average apparent density of approximately 0.2, a refractive index averaging 1.72 and an average chemical composition corresponding to the formula $C_{12}HCl_9$.

10. A finely powdered brominated diphenyl made up of irregularly shaped particles, said brominated diphenyl having at least eight bromine atoms in the molecule.

11. A finely powdered chlorinated diphenyl made up of irregularly shaped particles, said chlorinated diphenyl averaging in the neighborhood of nine chlorine atoms in the molecule.

RUSSELL L. JENKINS.
THEODORE W. SCHILB.